July 30, 1946.    A. MOUW    2,404,883
SPRING CONSTRUCTION
Filed April 17, 1942
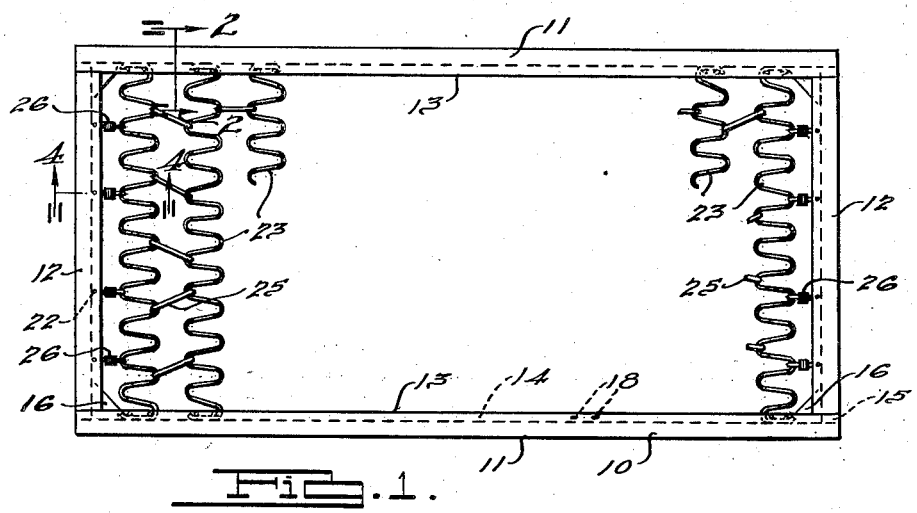
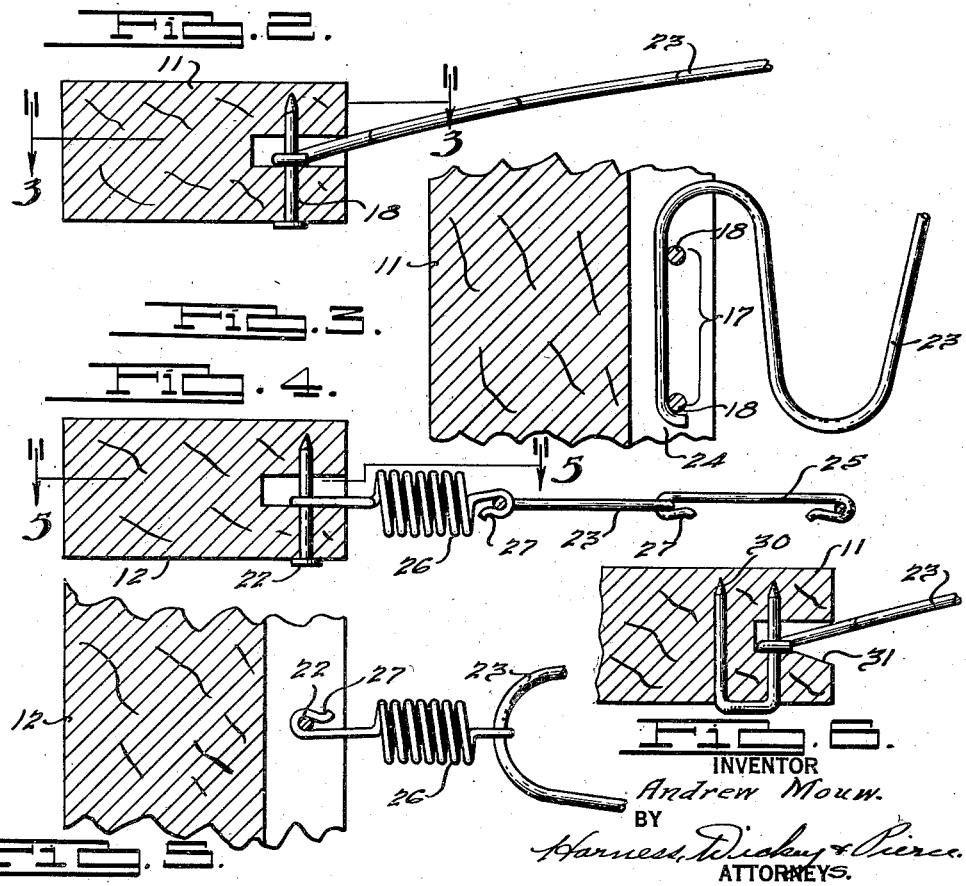
INVENTOR
Andrew Mouw.
BY
ATTORNEYS.

Patented July 30, 1946

2,404,883

UNITED STATES PATENT OFFICE 2,404,883

SPRING CONSTRUCTION

Andrew Mouw, Huntington Woods, Mich., assignor to No-Sag Spring Company, Detroit, Mich., a corporation of Michigan Application April 17, 1942, Serial No. 439,311

8 Claims. (Cl. 5—189)

My invention relates to spring constructions, and particularly to a spring structure and a method of assembling springs to a frame to form a spring surface.

The present invention pertains to attaching means for the ends of zig-zag spring strips. The strips follow the construction of the spring strip illustrated, described, and claimed in the Karl Kaden Reissue Patent No. 21,263, issued November 14, 1939. The invention pertains to a frame having slots on the inner faces of the frame members in which the ends of the spring strips may project. Nails are driven through the slots in the frame members from the under sides thereof to be disposed in pairs aligned with pairs on the opposite frame member. The projecting ends of the spring strips are disposed within the slots of the opposite members and move behind the pair of nails where the ends are retained by the reversely bent end portions on the ends of the strips. The assembled springs may be joined together by suitable clips and the endmost spring strips have coil springs hooked over the convolutions and over individual nails which are driven through the frame members at the opposite ends of the frame to project through the slots disposed therein. The nails are preferably assembled in the frame before the spring strips and coil springs are assembled, which assembly may be formed thereafter without the use of any tools.

Accordingly, the main objects of my invention are; to form a frame from opposite members having slots on the inner face through which pairs of nails extend for receiving the ends of the spring strips; to provide pairs of nails extending through slots in the inner face of the frame members which form anchoring means for the ends of spring strips extended thereacross; to construct a frame from wooden side and end members which have slots in their inner face through which nails project which form anchoring means for the end of spring strips extending across the side frame members and joined by coil springs to the end frame members; and in general, to provide a spring structure which is rigid, readily assembled, and economical of manufacture.

Other objects and features of novelty of my invention will be specifically pointed out or will become apparent when referring, for a better understanding of my invention, to the following description taken in conjunction with the accompanying drawing, wherein:

Figure 1 is a plan view of a spring unit embodying features of my invention;

Fig. 2 is an enlarged sectional view of the structure illustrated in Fig. 1, taken on the line 2—2 thereof;

Fig. 3 is a sectional view of the structure illustrated in Fig. 2, taken on the line 3—3 thereof;

Fig. 4 is an enlarged sectional view of the structure illustrated in Fig. 1, taken on the line 4—4 thereof;

Fig. 5 is a sectional view of the structure illustrated in Fig. 4, taken on the line 5—5 thereof; and, Fig. 6 is a view of structure similar to that illustrated in Fig. 2, showing another form of my invention.

I have illustrated the frame 10 comprising longitudinally disposed members 11 and end members 12, the inner faces 13 of which are provided with a slot 14. The end members 12 have a dowel 15 on their ends which project into the slot 14 on the members 11 to secure the members in aligned fixed relation. Gusset plates 16 may be disposed in the slots at each of the corners to further strengthen the frame.

The longitudinally extending members 11 have pairs 17 of nails 18, or similar pin-like elements, disposed in spaced relation and aligned on opposite sides of the frame. The nails project upwardly from the bottom of the frame, through the slots, into the upper portion of the members. Preferably holes are drilled through the lower half of the members by using a layout fixture, after which the nails are driven into the holes, through the slot into the upper portions of the members. In a similar manner, individual nails 22 are provided in the end members 12 for a purpose which will be explained hereinafter.

Spring strips 23, which are disposed across the frames, are of conventional form, being similar to the spring illustrated, described and claimed in the above-mentioned Karl Kaden reissue patent, which was assigned to the assignee of the present invention. The ends of the strips are provided with a hook 24 by which the springs are anchored against movement from the nails. After the frame has been constructed, with the nails in position, the spring strips are then assembled by hooking the ends of the spring over a pair of the nails and stretching the opposite end of the spring across the frame and disposing its end over the pair of nails 17 on the opposite longitudinally extending member 11. After all of the spring strips are assembled in this manner they may be joined together by a plurality of wire clips 25 to distribute the applied load over the strips.

The endmost strips are joined to the end members 12 by coil springs 26, the coil springs and clips having partially closed ends 27 by which they may be sprung over the wires of the spring strips 23 and securely anchored thereon. A similar end 27 is provided on the opposite end of the coil springs 26 which engages the nail 22 and secures the coil spring to the end members 12.

The assembly operation may be performed without the use of tools since it merely requires the insertion of the ends of the spring strips over the pairs of nails and the application of the clips 25 and the coil springs 26 thereto. The resulting spring structure is extremely rigid and durable, and provides a flat spring surface having the spring strips joined together and to the end frame members so as to distribute the applied load over all of the spring strips.

In Fig. 6, I have illustrated a further form of my invention; that wherein a staple 30 is employed in place of the nails 18 and 22. The staple provides further strength to the slotted edges of the frame elements 11 and 12 by having one leg extended into the wood rearwardly of the slot. The holes for the staples may be drilled partially into the wood, preferably from the underside of the frame, by the use of a drilling fixture. The spring strip 23 may be inserted in the apertures and the spring placed in position in the slot where they are secured when the staples are driven the remainder of the way into the wood. The staples may be driven completely into the wood and the ends of the springs hooked over the pair of lugs in the slot to secure the ends in position. In either manner of assembly the ends are supported over the adjacent pairs of pins which extend through the slots. I have illustrated a beveled edge 31 on the lower edge of the slot for preventing the spring from striking the edge when deflected.

I claim as my invention:

1. In a spring construction, a frame comprising longitudinally extending members and cross members which space the longitudinally extending members a predetermined distance apart, slots provided in inwardly presenting faces of the members, pins disposed in slots in oppositely disposed members of the frame in oppositely aligned pairs, and spring strips having laterally extending end portions with each end portion inserted in a slot and moved behind a pair of the pins for anchoring the strips across the frame.

2. In a spring construction, a frame comprising longitudinally extending members and cross members which space the longitudinally extending members a predetermined distance apart, slots provided in inwardly presenting faces of the members, pins disposed in slots in oppositely disposed members of the frame in oppositely aligned pairs, spring strips having laterally extending end portions with each end portion inserted in a slot and moved behind a pair of the pins for anchoring the strips across the frame, and coil springs engaging certain of the convolutions of the endmost strip with one end and having the opposite end anchored over pins projecting through the slots in the endmost members.

3. A spring construction including, in combination, a frame comprising spaced longitudinally extending members and end members attached thereto, the inner faces of said members being provided with slots, pairs of pins extending through the slots in said longitudinally extending members in aligned relation on opposite sides of the frame, spring strips made of wire having laterally extending ends hooked behind pairs of said aligned pins for forming a spring surface between said longitudinal members.

4. A spring construction including, in combination, a frame comprising spaced longitudinally extending members and end members attached thereto, the inner faces of said members being provided with slots, pairs of pins extending through the slots in said longitudinally extending members in aligned relation on opposite sides of the frame, spring strips made of wire having laterally extending ends hooked behind pairs of said aligned pins for forming a spring surface between said longitudinal members, said laterally extending ends having a reversely bent end portion which secures the ends in position.

5. A spring construction including, in combination, a frame comprising spaced longitudinally extending members and end members attached thereto, the inner faces of said members being provided with slots, pairs of pins extending through the slots in said longitudinally extending members in aligned relation on opposite sides of the frame, spring strips made of wire having laterally extending ends hooked behind pairs of said aligned pins for forming a spring surface between said longitudinal members, individual pins extending through the slots in the end members, and means for connecting the side portions of the endmost spring strips to the pins in said end members.

6. A spring construction including, in combination, a frame comprising spaced longitudinally extending members and end members attached thereto, the inner faces of said members being provided with slots, pairs of pins extending through the slots in said longitudinally extending members in aligned relation on opposite sides of the frame, spring strips made of wire having laterally extending ends hooked behind pairs of said aligned pins for forming a spring surface between said longitudinal members, said laterally extending ends having a reversely bent end portion which secures the ends in position, said pins being spaced from the bottom of the slots an amount sufficient to permit the reversely bent end portion to be inserted over the pins.

7. A spring construction, including, in combination, a frame comprising spaced longitudinally extending members and end members attached thereto, the inner faces of said members being provided with slots, gusset plates disposed in the slots in the inner corners of said frame, pairs of pins extending through the slots in said longitudinally extending members in aligned relation on opposite sides of said frame and spaced from the bottom of said slots, spring strips made of wire bent in zig-zag formation having laterally extending end portions reversely bent to form hooks which pass between the pins and bottom of the slots when the ends are inserted over the pairs of pins for forming a spring surface across the frame.

8. A spring construction, including, in combination, a frame comprising spaced longitudinally extending members and end members attached thereto, the inner faces of said members being provided with slots, gusset plates disposed in the slots in the inner corners of said frame, pairs of pins extending through the slots in said longitudinally extending members in aligned relation on opposite sides of said frame and spaced from the bottom of said slots, spring strips made of wire bent in zig-zag formation having laterally extending end portions reversely bent to form hooks which pass between the pins and bottom of the slots when the ends are inserted over the pairs of pins for forming a spring surface across the frame, individual pins extending through the slots in the end members, and means interconnecting the springs to each other and the pins in the end members.

ANDREW MOUW.